United States Patent [19]

Dayen

[11] Patent Number: 4,540,554
[45] Date of Patent: Sep. 10, 1985

[54] REMOVAL OF SOX, NOX, AND PARTICULATE FROM COMBUSTED CARBONACEOUS FUELS

[76] Inventor: William R. Dayen, 810 Joan Terrace, Reading, Pa. 19611

[21] Appl. No.: 617,396

[22] Filed: Jun. 5, 1984

[51] Int. Cl.$^3$ .......................... C01B 21/00; B01J 8/00
[52] U.S. Cl. .................................. 423/235; 423/239; 423/244
[58] Field of Search .......... 423/244 A, 244 R, 239 A, 423/235; 55/73

[56] References Cited

U.S. PATENT DOCUMENTS

| | | | |
|---|---|---|---|
| 3,544,263 | 12/1970 | Ninomiya | 423/244 A |
| 3,709,977 | 1/1973 | Fisher | 423/244 A |
| 4,091,076 | 9/1978 | Vogel | 423/244 A |
| 4,201,753 | 5/1980 | Dayen | 423/242 |

Primary Examiner—John F. Niebling
Attorney, Agent, or Firm—Benasutti & Murray

[57] ABSTRACT

The invention is a method for removing sulfur oxides, nitrogen oxides and particulate from the products of combusted carbonaceous fuels. Sulfur oxides, nitrogen oxides and particulate are currently discharged to the atmosphere as flue gas in quantities highly detrimental to the environment. Potassium compounds, as are found in agricultural grade potash, are dispersed throughout the combustion products at the exit of the combustion zone of boilers. The potassium compounds decompose as a result of combustion temperatures in excess of their melting points. The potassium, as an ionic vapor, reacts with the sulfur and nitrogen oxide gases present, to form potassium sulfates, potassium nitrites and potassium nitrates. When the combined products stream, tranversing the boiler equipment train, cool sufficiently, the potassium, present in excess, condenses as potassium oxide on the surfaces of the particles present. The larger particles are removed from the non-condensed vapor and gas by the centrifugal and gravitational forces exerted within cyclones. The smaller particles are removed from the non-chargable vapor and gases by the electrostatic charge and attraction created within the precipitator. The dry particles discharged from the cyclones and precipitator are ready for ultimate end use as potash fertilizer without further treatment. The flue gas atmospheric emissions contain only trace quantities of sulfur oxides, nitrogen oxides and particulate.

9 Claims, 1 Drawing Figure

REMOVAL OF SOX, NOX, AND PARTICULATE FROM COMBUSTED CARBONACEOUS FUELS

SUMMARY OF THE INVENTION

Objectives Of The Invention

The objectives of the invention are:

1. To reduce sulfur oxides, (SOx), nitrogen oxides (NOx) and particulate found in the flue gas atmospheric emissions of fossil fueled boilers to trace quantities.

2. To restrict the atmospheric emissions of carbon dioxide to quantities generated by the combustion of fossil fuels.

3. To minimize the capital investment and operating costs for the industry wide effort which must be made to clean up our environment.

The immediate effect of the current levels of SOx, Nox, and particulate in our atmosphere is the respiratory impairment suffered by humans in localized atmospheric temperature inversions. The longer range destructive effects of "acid rain" on water supplies, biota amd structures of steel and stone are evident hundreds of miles downwind of the discharge points. The most far reaching adverse impact, so far as the scientific community is concerned, is the catastrophic potential of the "greenhouse effect", which is thought to be largely the result of carbon dioxide released by combustion of fossil fuels.

The capital investment requirements and operating costs to effect significant reductions of SOx, NOx, and particulate by current state-of-the-art processes are very high. In addition, the removal of undesirable constituents from the flue gas by current in-place technology results in enormous landfills of chemical sludge which are highly detrimental to best land utilization and can pollute our surface streams and groundwater supplies.

Current Atmospheric Emissions Cleanup Technology

Current cleanup of atmospheric emissions from industrial boilers is limited to three basic operations: (1) combustion control of oxygen to reduce NOx emissions; (2) the use of electrostatic precipitators to reduce particulate emissions; (3) the use of flue gas desulfurization processes to reduce SOx emissions.

The first concept is much abused by operators. Excess oxygen results in complete combustion of the carbon, which improves thermal efficiency. Oxygen in excess of stoichiometric requirements results in increased NOx. Current fuel economics do not favor the reduction of thermal efficiencies. Therefore, increased quantities of NOx enter the atmosphere.

The second concept has severe limits. The removal of particulate by electrostatic precipitators is limited by the concentration of electrostaticaly reactant gases in the combustion products. Designers and operators are aware that best particulate removal occurs when higher sulfur and salt content coals are combusted. Units operating with precipitator efficiencies of less than 99 percent generally do not meet the current Clean Air Act Standards of 260 micrograms per cubic meter, averaged for 24 hours, and 75 micrograms per cubic meter, averaged over a year.

The capital investment required to install a current, proven flue gas desulfurization process in an existing non-compliance power plant (not meeting current Clean Air Act emission limits of 1.2 lbs SOx per Million BTU, as fired) may be as high as $650 per kilowatt hour. The total capital investment estimated for upgrading the non-compliance power plants may exceed the initial investment of these facilities.

The capital investments that may be required for a complete flue gas desulfurization process include:

1. Land for the on-site storage of the chemical reagents, (lime, limestone, alkali) and the off-site disposal of the chemical sludge generated by the process.

2. Monitoring wells, spillways and impoundment areas equipped with pollution detection and removal equipment which will protect our surface and groundwater supplies.

3. Transport vehicles for reagent and chemical sludge.

4. Equipment: pulverizers for reagents and coal; solution vessels for reagents; chemical reaction vessels for contacting the reagent solution and products of combustion; sludge thickening filters; corrosion resistant stack lining.

Increased operating costs include:

1. Manpower: to operate, monitor and control the pulverization and flue gas desulfurization process equipment.

2. Chemical reagents: which will amount to at least one pound of reagent per pound of coal fired depending on the process and reagent used.

3. Electrical power: which will amount to at least a 5 percent increase in total plant requirements, depending on the process used.

4. Process steam: which can amount to 15 percent of steam generating capacity, providing flue gas reheat is required.

5. Process water: which can amount to hundreds of gallons per minute, depending on the process used.

6. Reduction in thermal efficiency: due to the introduction of large quantities of reagent and water in the combustion products, depending on the process being used.

Acceptable Fuels And Combustion

The type of fuel is not a consideration when the invention is used. Coal, gas, oil, shale, peat, lignite, agricultural waste, combustible municipal refuse and industrial off-gas are completely compatible fuels. The invention will remove SOx, NOx and particulate generated by the combustion of any of these fuels.

The combustion of each fuel requires specific combustion conditions. The invention requires only that the combustion temperature be sufficient to decompose potassium oxide (350 degrees Celcius/889 degrees Fahrenheit).

The invention does not restrict the quantity of excess oxygen used for complete combustion. Optimum thermal efficiencies can be realized with a minimal increase of reagent.

Potash As The Chemical Reagent

Powdered agricultural grade potash is dispersed into the combustion products stream at the exit of the combustion zone in the boiler. The moisture content of the potash should be as low as possible. Excess moisture in the potash results in a temperature reduction at the exit end of the combustion zone, thus reducing thermal efficiency.

Agricultural grade potash is sold on a unit-ton pricing basis, i.e., multiple the unit price by the percent potassium oxide guaranteed in the potash. The potassium oxide content of agricultural grade potash is commonly quoted at 62.0 to 62.4 percent amd the current unit price is from $0.82 to $0.94, fob, Saskatchewan, Canada.

Other potassium-containing natural resources and other potassium salts have been evaluated with respect to: (1) price per unit of potassium; (2) immediate availability; (3) rail and ship delivery; (4) the number of power generating stations spread throughout the United States, Canada and the rest of the world. The use of potash for reducing undesirable atmospheric emissions from fossil fired boilers may become as great as or exceed the agricultural use of potash (current United States consumption is estimated at 6 million tons per year).

Potash, as the reagent, has several advantages over other natural resources such as limestone and alkali and manufactured products such as lime and chelatants:

1. Potassium, the primary element in potash is more highly reactive than any of the alkaline earths except lithium.

2. The stoichiometric multiplier (the theoretical versus actual weight of reagent added to drive the reaction to completion) is lower for potassium than for sodium, calcium or magnesium when the reactions are with SOx and NOx. The stoichiometric multiplier for the reaction of potassium plus sulfur dioxide to give potassium sulfate, as well as for the reaction of potassium plus nitrogen oxide to give potassim nitrate, is about 1:1.1. To form sulfate salts of sodium, calcium or magnesium, the stoichiometric multiplier will range between 1:1.5 to 1:3, depending on the process and reaction conditions.

3. Potassium reacts energetically with SOx and NOx when in an ionic vapor phase. Sodium, calcium and magnesium react most effectively in liquid phase conditions and only with SOx.

4. In its natural form potash contains relatively small amounts of carbon dioxide. Most natural deposits of limestone and alkali are carbonates, containing pound for pound more carbon dioxide than calcium and magnesium in the limestone and sodium in the alkali. Carbon dioxide, in excessive quantities, is detrimental to the World's ecological balance.

5. The reactions of potassium with SOx, NOx and flyash does not alter the essential nutrient fertilizer value of potassium. The presence of the sulfates, nitrites and nitrates enhances the fertilizer value of the solids discharged.

Removal Of Flyash, SOx, NOx and Particulate

The removal of SOx, NOx, flyash and particulate from the combustion products of fossil fired boilers is the result of four distinct functions:

1. The first function is a vapor phase chemical reaction to form potassium salts. This function begins to occur at the exit of the boiler combustion zone and is completed before the combustion products reach the cyclones. The potassium, in ionic vapor form, reacts with gaseous SOx and NOx to form electrostatically precipitable potassium sulfate, potassium nitrite and potassium nitrate.

2. The second function is a condensation of certain reactants. This function occurs as the combustion products cool while flowing from the boiler combustion zone to the cyclones and electrostatic precipitator. The potassium salts condense as small particles. Unreacted potassium condenses as a potassium oxide coating on the flyash particles, increasing apparent density and decreasing the resistivity of the particles. The large surface to weight ratio of the micron and sub-micron sized particulate reduces particulate resistivity by a factor of 100 to 1000; thus the flyash particulate becomes ideally suited for electrostatic precipitation. Any remaining potassium condenses as potassium oxide, which is also electrostatically precipitable.

3. The third function separates most of the flyash and the larger particles of the potassium salts from the gases and vapor in the combustion products stream. The centrifugal and gravitational forces acting within the cyclones cause the separation. The flyash removal efficiency of the cyclones is improved due to a small increase in apparent density as a result of the condensation coating of potassium oxide.

4. The fourth function electrostatically separates flyash and potassium salt particulate from the gases and vapor in the combustion products stream. This function occurs within the electrostatic precipitator. The particulates accept an electrostatic charge and are attracted and collected on oppositely charged plates. The collector plates are subjected to mechanical forces which cause the collected particulates to fall to the bottom of the precipitator. The particulates are removed by mechanical means.

Improved Electrostatic Precipitator Efficiency

Particulate removal in conventionally designed and operated electrostatic precipitators can approach 99.5 percent. However, to reach ultimate efficiency the fuel must contain at least 2.5 percent sulfur. One proven method to increase particulate removal is to add gaseous sulfur oxides to the combustion products upstream of the precipitator. The addition of sulfur oxides reduces particulate resistivity. It has been shown that fuels with 2.5 to 3 percent sulfur, have resistivities 100 times less than fuels with 0.5 to 1.0 percent sulfur.

The Clean Air Act of 1970 permits the combustion of coals conaining less than one percent sulfur in lieu of the installation of a flue gas desulfurization process. The undesirable result of the alternative method to reduce SOx emissions is the increased emissions of particulate.

The invention improves electroststic precipitator efficiency when the fuel combusted has a low sulfur content. Potassium in excess of stoichiometric requirements decreases paticulate resistivity 10 to 1000 times, resulting in particulate removal efficiencies approaching 99.9 percent.

Magnetohydrodynamic Power Generation Compared

In magnetohydrodynamic (MHD) power generation, preheated powdered coal, potassium carbonate and pure oxygen are subjected to pressurized combustion at 200 psia. The resulting temperature is about 5000 degrees F. The combustion products become ionic plasma conductors and pass through a supercooled, supermagnetic (10 Tesla) field at velocities greater than Mach 1. The combustion products leaves the magnetic field at sub-sonic velocity, cooled to about 3000 degrees F. The remaining thermal energy is converted to elctrical power by conventional steam turbine-generator equipment. By the year 1990 the electrical power generated is expected to reach 90 to 95 percent of the thermal input.

The MHD test facilities in the United States and Russia are not particularly concerned with atmospheric emissions. In the MHD test facilities SOx, NOx and paticulate are conditioned for removal by being subjected to conditions much different from the invention requirements. The invention does not require:

1. Special pre-combustion conditions. In MHD high heat value fuel is required. If coal is used it must be ground to 200 mesh. Fuel, oxygen and reagent must be preheated. The invention accepts conventional combustion of any fossil fuel.

2. The elevated temperature and pressure conditions of MHD combustion. Coventional fossil fired combustion temperatures of 2300 to 2600 degrees F. are more than adequate to insure the decomposition of potassium oxide at 662 degrees F.

3. The high concentration of reagent. The potassium carbonate required for MHD combustion is 10 percent of the weight of coal, as received, while for the invention the potash added is about one (1) percent of the coal weight, as fired.

4. The quality of the reagent. In MHD generation, technical grade potassium carbonate, which is an expensive, purified, manufactured chemical, is required. The invention uses agricultural grade potash, an inexpensive natural deposit.

5. All of the combustion products to become electrical conductors. In MHD, it is the number of discrete conductors cutting the lines of the magnetic force field which generates the electric current. The invention lowers the resistivity of SOx, NOx and particulate only to the extent that they become electrostatically precipitable.

6. Bag houses or special filters. In MHD over 99 percent of the particulate is less than one (1) micron, thus conventional cyclones and electrostatic precipitators are rendered ineffective in removing the particulate. The use of bag houses appears to be a viable method for the removal of particulate. Spray tower quench collection with subsequent settling has been evaluated and found to be economically unacceptable. The invention enhances the particulate removal efficiencies of cyclones and electrostatic precipitators.

7. Increases in carbon dioxide emissions. The potassium carbonate reagent in MHD increases carbon dioxide emissions by 0.013 pounds per pound of coal fired. The potash reagent used in the invention could increase carbon dioxide emissions by as much as 0.000195 pounds per pound of coal fired, providing the potash contains two (2) percent carbonates.

DETAILED DESCRIPTION

Figure 1:
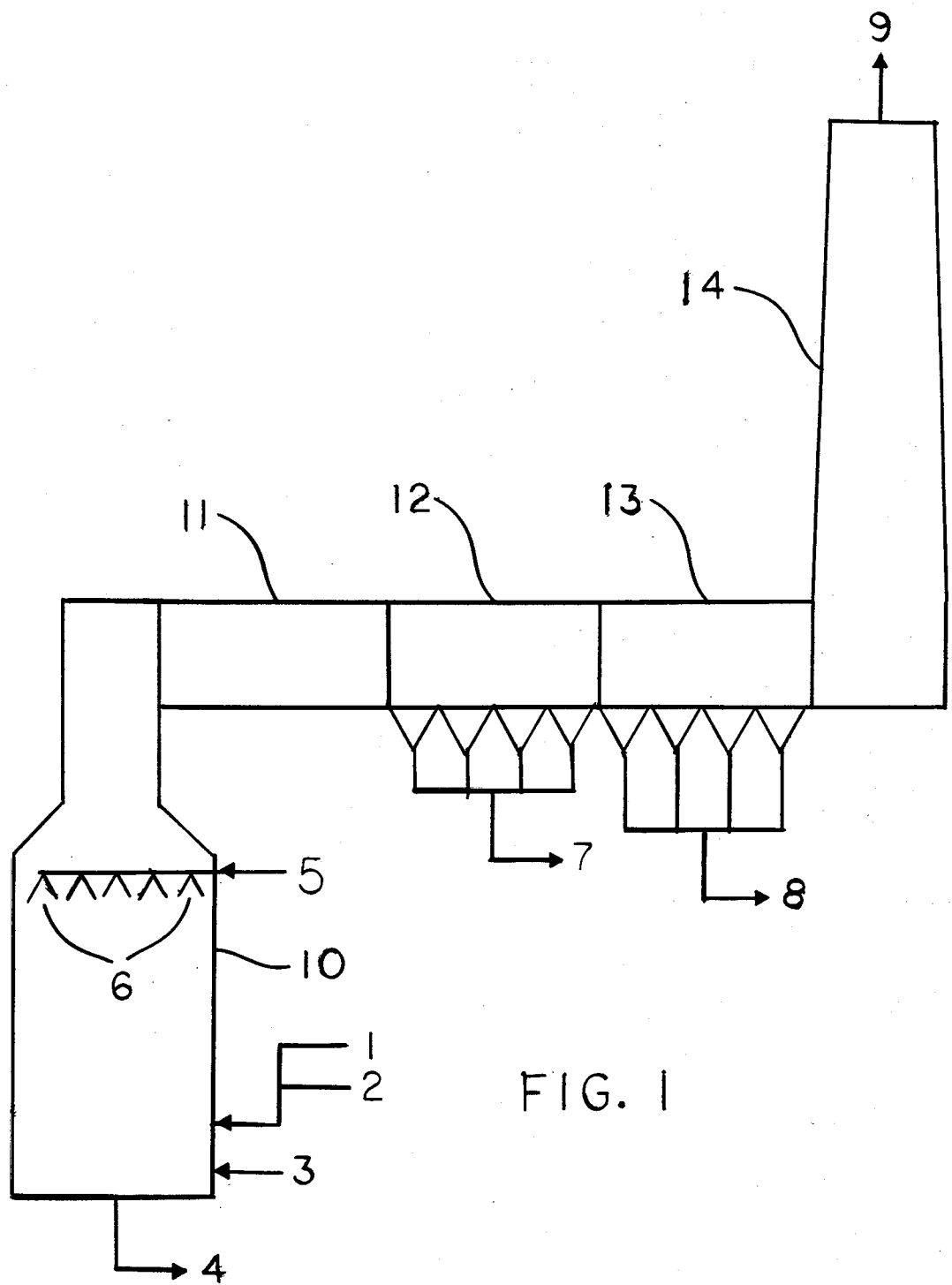

FIG. 1 is a diagramatic pictoral of an atypical fossil fueled steam generating equipment train. The inter-relationships of the invention to the steam generating equipment train are designated by numbers 1 through 9. The conventional components of the steam generating train are designated by numbers 10 through 14.

A. Combustion Of Fuel

The fuel 1 and primary combustion air 2 concurrently enter the ignition section of the combustion zone of the boiler 10 through conventional burners. The invention does not restrict the type of carbonaceous fuel and does not alter existing combustion practices.

In cyclonic type boilers, the primary combustion air transports the coal into the boiler, disperses the coal throughout the combustion zone of the boiler and maintains the flame front.

Secondary combustion air enters the boiler 10 at 3. The only function of the secondary air is to supply the excess oxygen necessary for complete combustion of the carbon in the fuel. Complete combustion of the carbon is a paramount consideration in the fuel cost of steam generation. However, complete combustion generates slightly greater quantities of carbon dioxide and nitrogen oxides.

The invention permits ultimate thermal utilization of the fuel combusted. While carbon dioxide emissions are increased, NOx emissions are reduced to trace quantities by a minimal addition of reagent. In addition, equipment corrosion rates may be decreased due to alkaline neutralizing characteristics of the reagent.

Combustion temperatures in conventional boilers range from 2300 to 3000 degrees F. The products of complete combustion include bottom ash, flyash, nitrogen, excess oxygen, carbon dioxide, SOx, NOx and moisture vapor. Bottom ash is discharged at 4. The remaining combustion products traverse the combustion zone of the boiler 10 to the point where the reagent is injected at 6.

B. Addition Of Reagent

Agricultural grade potash is introduced into the exit end of the boiler 10 at 5. The potash is in powder form, having been pulverized preferably to 200 mesh. The air fluidized potash is dispersed through a predetermined number of injection nozzles at 6. The injection pressure of the fluidized potash must exceed the pressure within the combustion zone at the point of dispersion in order to effect intimate mixing of the potash with the combustion products.

The weight of potash to be added is calculated according to traditional mathematic and stoichiometric relationships:

1. The weight of potash required per hour to effectively remove all of the SOx, NOx and flyash particulate is the quotient of the stoichiometric potassium oxide requirements divided by the potassium oxide content of the potash times the stoichiometric multiplier (a predetermined excess factor to ensure the reaction goes to completion).

2. The weight of potassium oxide requirements are the sum of:

A. The product of the pounds of coal fired per hour times the decimal percent of the sulfur in the coal divided by (mol. wt. of sulfur) times 64 (mol. wt. of sulfur dioxide) times 94 (mol. wt. of potassium oxide) divided by 64 (mol. wt. of sulfur dioxide).

B. The product of the pounds of NOx formed during combustion times 94 (mol. wt. of potassium oxide) divided by $2 \times 46$ (mol. wt. of nitrogen oxide). The weight of NOx is calculated by conventional combustion stoichiometry.

C. The product of the pounds of coal per hour times the decimal percent of the ash in the coal times the decimal percent of flyash times 94 (mol. wt. of potassium oxide) divided by 101 (est. mol. wt. of ash). The flyash/bottom ash ratio varies widely depending on the fuel quality and the type of boiler.

C. Chemical Reactions

While exiting the boiler combustion zone, the potassium oxide in the potash decomposes to positively charged potassium ions. The SOx and NOx are gaseous combustion products which, under the combustion conditions, react as negatively charged ions and form potassium sulfate and potassium nitrate.

The temperature, humidity, excess oxygen and excess potassium in the long and labyrinth reaction paths downstream of the boiler 10 and the affinity between sulfur dioxide and potassium can result in 99 plus percent of the sulfur dioxide reacting.

The same reaction conditions, as above, for potassium and NOx are more favorable for the formation of nitrate than nitrite. The affinity of the gaseous nitrates or nitrites to potassium is about the same as for sulfur, thus 99 plus percent of the NOx reacts to form potassium salts.

Potassium salts have low resistivity, thus easily accept an electrostatic charge.

D. Condensation

The combustion products cool as they exit from the combustion zone of the boiler 10 and pass through the air preheaters 11, enroute to the cyclones 12 and the electrostatic precipitator 13. When the temperature decreases sufficiently (below 662 degrees F.) the excess potassium condenses as potassium oxide. The potassium oxide condenses on the surfaces of flyash particles, giving the particle a coating. Condensation occurs preferentially on the small micron and sub-micron sized particulate. The smaller particles have the largest surface to apparent density ratio and tend to cool more rapidly than larger flyash particles.

Potassium oxide has low resistivity. The resistivity is sufficiently low to permit the smaller particulate to accept the electrostatic charge. Any remaining potassium condenses as potassium oxide particulate.

E. Removal Of Solids

The bottom ash discharges at 4. The discharge rate of bottom ash is dependent on the fuel firing rate, the ash content of the fuel, the type of boiler and combustion conditions. The invention does not alter materially the quantity or characteristics of the bottom ash under a given set of operating conditions.

The larger particles of flyash, potassium sulfate and potassium nitrate are removed from the combustion products by the centrifugal and gravitational forces reacting within the cyclones 12 at 7. The invention does not alter the conditions of cyclone operation. Any increase in the rate discharge of flyash and other solids from the cyclones, due to increased flyash weight resulting from potassium oxide condensation on flyash particle surfaces plus the additional weight of precipitated potassium salts is well within normal design parameters for cyclones. The additional volume of gaseous products resulting from the introduction of potash to should be not considered significant.

The small micron and sub-micron particles of potassium nitrate/nitrite, potassium oxide, potassium sulfate and flyash particulate are removed from the combustion products traversing the labyrinth passageways of the precipitator 13 at 8. The electrostatic and mechanical functions of the electrostatic precipitator may have to be altered since the invention may triple the weight of particulate removed by the precipitator. The additional weight of removed particulate from the combustion products plus the inactive impurities in the reagent plus the potassium products will equal or exceed the total ash content of the coal. The weight of particulate discharged from the precipitator is dependent upon the sulfur content of the coal, the NOx generated during combustion, the quality of the potash, the bottom ash-flyash ratio and the removal efficiency of the cyclones.

F. Quality Of The Solids

The invention does not contribute any beneficial or detrimental qualities to the bottom ash discharged at 4. The invention permits complete combustion of the carbon in the fuel, thus the weight of the bottom ash and carbon content may be reduced proportionately. When the invention is employed, the runoff and leachate issuing is unchanged from that of conventional bottom ash landfills.

The invention adds beneficial qualities to the flyash discharged from the cyclones at 7. The potassium, present in the form of potassium salts and potassium oxide, is unaltered as an essential nutrient for plant growth. The percentage of potassium present in the flyash is a function of the amount of potash added. The percentage of potassium present (calculated as potassium oxide) may be equal to the potassium oxide found in balanced agricultural fertilizers. The flyash discharged from the cyclones may be directly marketable as a potash fertilizer to local consumers. The flyash now contains potassium as well as other beneficial trace elements and has good soil conditioning properties. In the event the flyash discharged from the cyclones must be consigned to permanent landfills, any resulting runoff or leachate will contain more than normal amounts of potassium but not to the extent of adversely affecting the surface runoff or ground water supplies.

The benefits added to the particulate discharging from the electrostatic precipitator (13) at 8 are greater than those benefits added to flyash discharged from the cyclones 12 at 7. Except for trace quantities, the remaining potassium sulfates, nitrites, nitrates and oxides are removed from the combustion products by the precipitator. The equivalent potassium oxide content in the precipitator particulate may approach the potassium oxide content found in lower grades of potash. The potassium nitrites/nitrates, present in quantities of an order of magnitude less than the potassium sulfates, is sufficient to enhance plant growth. When admixed with conventional nitrogen (ammonia or urea) and phosphorous (phosphate rock) sources, a balanced fertilizer will result. The iron and sulfates present in the precipitator solids are also considered essential to plant growth. Iron sulfate is commonly applied to farmlands in many areas, particularly in the Southwest.

G. Atmospheric Emissions

The cleaned flue gas discharges from the stack 14 as atmospheric emissions at 9.

The cleaned flue gas is a mixture of 99 plus percent nitrogen, carbon dioxide and oxygen gases and water, as vapor and droplets. The flue gas mixture contains less than one (1) percent of SOx, NOx, particulate and potassium products.

The undesirable atmospheric emissions of SOx, NOx and particulate are reduced to trace quantities when the invention is employed at maximum removal potential.

The invention minimizes the undesirable atmospheric emissions of carbon dioxide. Flue gas desulfurization processes using lime, limestone or alkali emit at least an additional 10 pounds of carbon dioxide to the atmosphere for each million BTU fired, which is about a two (2) percent increase over the carbon dioxide generated by the combustion of an average coal.

Invention Requirements

1. The invention requires the boiler equipment train to have an electrostatic precipitator. Existing electrostatic precipitators may require modification in order to accommodate the increase in the solids discharged.
2. The invention requires the purchase of acceptable particle sized potash or the installation of size reduction equipment.
3. The invention requires the installation of equipment necessary to fluidize, introduce and intimately disperse the potash among the combustion products. The use of potash solutions is discouraged. The additional water results only in reductions of the combustion temperatures and boiler efficiencies.
4. The invention may require on-site storage of potash.
5. The invention may require on-site temporary storage for for the flyash and particulate if they are to be offered for local sale.
6. The invention may require enlargement of existing ash disposal area for the additional potassium products and potash residues discharged from the cyclones and precipitator. New landfill areas will require regulatory environmental approval.

H. Economic Justification

The invention incorporates the following economic justifications:

1. Undesirable atmospheric emissions of SOx, NOx and particulate can be reduced to trace quantities at nominal expense to investors, operators, consumers and the general public.
2. Complete combustion of carbon in the fuel permits optimization of thermal efficiency.
3. The reagent effective cost of potash is equal to or less than cost of lime, limestone, alkali or chelatants.
4. The cost of the additional equipment required to introduce the reagent and remove the SOx, NOx and particulate is at least one order of magnitude less than for any currently in-use process.
5. The thermal and electrical energy requirements to effect removal of the undesirable constituents from the combustion products are lower than for any currently in-use process.
6. The removal efficiency is directly proportional to the amount of reagent introduced. Incremental removal of the selected undesirable constituents, and to some extent the preferential removal of SOx, can be effected by controlling the quantity of potash intoduced.
7. The solids discharged from the cyclones and precipitator have economic value. The savings to power station operators, agricultural users and consumers can be significant when cyclone and precipitator solids are sold at or below local equivalent potash prices. The power station operator is not forced to pay for solids disposal which involves costs for land, transport and landfill operations. The agricultural users receive enhanced potash (included are significant quantities of sulfates, nitrites and nitrates, desirable trace elements, iron, soil conditioners) at minimum cost. The consumer benefits are reflected by minimum and affordable price increases and a cleaner environment.
8. Minimum quantities of carbon dioxide are released to the atmosphere, when potash is the reagent. When the reagent is lime, limestone or alkali, the carbon dioxide to alkaline earth mole ratio ranges from 1.1:1 to 1.9:1. The carbon dioxide to alkaline earth mole ratio for potash is about 0.1:1. The additional carbon dioxide emissions to our atmosphere from lime, limestone, or alkali serve only to increase the adverse environmental impacts of "acid rain" and the potential for the catastrophic results of a "green house" atmospheric envelope condition.
9. The corrosion rates of the steam boiler train equipment are reduced by the alkaline earth reaction of potassium with the highly acidic combustion products stream. The pH of stack condensate from flue gas is typically 1.5. Since the highly acidic sulfur and nitrogen oxides have been completely neutralized, the pH downstream of the combustion zone will be significantly higher.

It is apparent from my detailed description that the present invention provides a novel, efficient and economical method for removing SOx, NOx, and particulate from the combustion products of carbonaceous fuels combusted in boilers. The removal capability is variable, controlled by the quantity of reagent injected. The invention has the capability to reduce SOx, NOx, and particulate emissions to the atmosphere to levels below the current atmospheric emission limits established by the Environmental Protection Agency under the Clean Air Act of 1970 at an affordable cost.

The invention permits reduction to trace quantities of SOx, NOx and particulate without major changes to conventional boiler train equipment or standard operating procedures.

The invention produces dry solid products, which have economic value, contain essential plant nutrients and do not pose pollution potentials to our environment.

The reductions of SOx, NOx, particulate and carbon dioxide effected by the invention can greatly improve both land and atmospheric environments. The reductions of SOx and NOx can significantly mitigate the adverse environmental impacts of "acid rain." The potential for the "green house" envelope effect can be slightly decreased. Best land utilization practices can be practiced. Increases in chemical sludge landfills can be prevented. Plant growth can benefit since flue gas emissions can approach normal air quality, and essential plant nutrients can be distributed effectively.

The invention is illustrated and described in general terms. It is understood that all specifics are site-dependent and fall within the following claims.

I claim:

1. The method of removing SOx, NOx and particulate from the combustion products stream of carbonaceous fuels, said method comprising the steps of:
   (a) injecting dry potash of predetermined particle size into said combustion products stream in a region thereof having a first predetermined temperature in order to effect vaporization of the potassium compounds in the said potash to ionic form, said potassium compounds comprising predominately potassium chloride;
   (b) permitting the preferential affinity reactions of said potassium ions with said SOx and NOx contained in the said combustion products stream to form potassium salts including at least potassium sulfate and potassium nitrate in the long and convoluted reaction zone afforded in the conventional and existing boiler equipment train;
   (c) cooling of the said combustion products stream, potassium salts and excess potassium ions by conduction, convection and radiation to a second predetermined temperature afforded in the intentional design of the conventional and existing boiler equipment train, thereby effecting condensation of said potassium salts and said excess potassium ions as a coating of potassium oxide on flyash particles; and (d) separating substantially off of said flyash particulate and potassium salts from the products of combustion.

2. The method in accordance with claim 1 wherein step (b) additionally forms potassium nitrite.

3. The method in accordance with claim 1 wherein step (c) additionally effects condensation of any remaining potassium ions as particulate potassium oxide which is separated from said combustion products stream in accordance with step (d).

4. The method in accordance with claim 1 wherein said particle size of said potash is 200 mesh or smaller.

5. The method in accordance with claim 1 wherein said first predetermined temperature is not lower than the minimum decomposition temperature of potassium compounds present in the said potash.

6. The method in accordance with claim 5 wherein the said minimum decomposition temperature is approximately equal to 350 degrees Celcius.

7. The method in accordance with claim 1 wherein said second predetermined temperature does not exceed the minimum melting point temperature of the said condensation products contained in the said combustion products stream.

8. The method in accordance with claim 7 wherein said minimum melting point temperature is approximately equal to 300 degrees Celcius.

9. The method in accordance with claim 1 wherein step (d) comprises the steps of:

(1) mechanically separating and removing potassium containing condensation products and flyash particles from the combustion products stream wherein the existing conventional cyclones of the boiler equipment train are used; and (2) electrostatically separating and removing substantially all of any remaining potassium containing condensation products and flyash particulate from the combustion products stream wherein the existing conventional electrostatic precipitator in the boiler equipment train is used.

* * * * *